US012592874B2

(12) United States Patent
Abdelhameed et al.

(10) Patent No.: US 12,592,874 B2
(45) Date of Patent: Mar. 31, 2026

(54) VALIDATION OF TIME SYNCHRONIZATION

(71) Applicant: Bayerische Motoren Werke Aktiengesellschaft, Munich (DE)

(72) Inventors: Mohamed-Saad Abdelhameed, Dachau (DE); Manjeet Singh Bilra, Hoerlkofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 287 days.

(21) Appl. No.: 18/286,805

(22) PCT Filed: Apr. 16, 2021

(86) PCT No.: PCT/EP2021/060003
§ 371 (c)(1),
(2) Date: Oct. 13, 2023

(87) PCT Pub. No.: WO2022/218554
PCT Pub. Date: Oct. 20, 2022

(65) Prior Publication Data
US 2024/0195716 A1 Jun. 13, 2024

(51) Int. Cl.
*H04L 43/0823* (2022.01)
*H04J 3/06* (2006.01)
*H04L 12/403* (2006.01)

(52) U.S. Cl.
CPC ........ *H04L 43/0823* (2013.01); *H04J 3/0667* (2013.01); *H04L 12/403* (2013.01)

(58) Field of Classification Search
CPC ... H04L 43/0823; H04L 12/403; H04J 3/0667
(Continued)

(56) References Cited

U.S. PATENT DOCUMENTS

2006/0045135 A1 3/2006 Hetzel et al.
2011/0160951 A1 6/2011 Ishigooka et al.
(Continued)

FOREIGN PATENT DOCUMENTS

DE 10 2014 215 078 A1 2/2016
EP 3 166 242 A1 5/2017
(Continued)

OTHER PUBLICATIONS

European Office Action issued in European Application No. 21 720 424.7 dated Oct. 29, 2024 (7 pages).
(Continued)

*Primary Examiner* — Faisal Choudhury
(74) *Attorney, Agent, or Firm* — Crowell & Moring LLP

(57) ABSTRACT

A method for validating time synchronization in a communication network of an automated vehicle includes sending a time synchronization message from a master clock to two control units of a first communication network, respectively, wherein the time synchronization message includes a master time; synchronizing a local time of the two control units of the first communication network to the received master time, respectively; sending the synchronized local times of the two control units of the first communication network to a central validator of the first communication network, respectively; comparing, at the central validator of the first communication network, the received synchronized local times of the two control units of the first communication network to each other; and, if a difference between the received synchronized local times is larger than a predefined first threshold, outputting an error message from the central validator of the first communication network to the automated vehicle.

11 Claims, 2 Drawing Sheets

(58) Field of Classification Search
USPC .......................................................... 370/503
See application file for complete search history.

(56) References Cited

U.S. PATENT DOCUMENTS

| | | | | |
|---|---|---|---|---|
| 2015/0003443 | A1 | 1/2015 | Koenigseder et al. | |
| 2016/0080533 | A1 | 3/2016 | Jeon et al. | |
| 2017/0026144 | A1 | 1/2017 | Zinner | |
| 2019/0205272 | A1* | 7/2019 | Fodor | G06F 16/903 |
| 2019/0245690 | A1 | 8/2019 | Shah et al. | |
| 2020/0127751 | A1* | 4/2020 | Itagaki | H04J 3/0667 |
| 2023/0262625 | A1* | 8/2023 | Lyu | H04W 56/001 |
| | | | | 370/350 |

FOREIGN PATENT DOCUMENTS

| | | |
|---|---|---|
| JP | 2011-24205 A | 2/2011 |
| JP | 2011-131762 A | 7/2011 |
| JP | 2013-135315 A | 7/2013 |
| JP | 2016-34065 A | 3/2016 |
| JP | 2020-167616 A | 10/2020 |
| KR | 10-2019-0035849 A | 4/2019 |
| WO | WO 2013/139662 A1 | 9/2013 |
| WO | WO 2018/057322 A1 | 3/2018 |

OTHER PUBLICATIONS

Aboubacar Diarra—Robert Bosch GmbH, "In-Vehicle Global Synchronization", IEEE 802.1 Plenary Meeting, BOSCH, Jul. 16, 2013, vol. 802.1, No. v01, pp. 1-26, XP068059491 (26 pages).
Japanese-language Office Action issued in Japanese Application No. 2023-562598 dated Mar. 5, 2025 with English translation (7 pages).
Korean-language Office Action issued in Korean Application No. 10-2023-7038956 dated Apr. 30, 2025 with English translation (10 pages).
International Search Report (PCT/ISA/210) issued in PCT Application No. PCT/EP2021/060003 dated Jan. 14, 2022 (4 pages).
Written Opinion (PCT/ISA/237) issued in PCT Application No. PCT/EP2021/060003 dated Jan. 14, 2022 (7 pages).
"(R) Taxonomy and Definitions for Terms Related to Driving Automation Systems for On-Road Motor Vehicles", Surface Vehicle Recommended Practice, SAE (Society of Automotive Engineering) International, J3016™, Sep. 2016, pp. 1-30 (30 pages).

* cited by examiner

VALIDATION OF TIME SYNCHRONIZATION

BACKGROUND AND SUMMARY

The present invention is directed to a method for validating a time synchronization in a communication network of an automated vehicle, and to an automated vehicle configured to carry out the method.

With an increasing complexity of autonomous or automated vehicles, multiple communication busses are used by different electronic control units (ECUs) to ensure that autonomous or automated driving functions fulfill safety requirements, e.g. requirements needed to fulfill a so called Automotive Safety Integrity Level (ASIL).

The Automotive Safety Integrity Level is a risk classification scheme defined by ISO 26262—Functional Safety for Road Vehicles. The ASIL classification comprises four safety levels, starting from ASIL A with the lowest safety requirements to ASIL D having the highest safety requirements. Furthermore, hazards that are identified as QM do not dictate any safety requirements.

All related controllers which take part in critical decision making of automated driving functions need to have a synchronized time according to the other controllers. Time synchronization for highly automated vehicles, e.g. a car of a SAE Level 3 or Level 4 or higher (wherein the SAE J3016 standard describes classification and definition of terms for road-bound vehicles with automated driving systems), need to fulfill ASIL B or higher.

In the state of the art, time synchronization of an Ethernet bus is done according to IEEE 802.1AS for a TSN (time sensitive network) and IEEE 1588 with respect to the PTP (Precision Time Protocol). However, for time synchronization via PTP there are several measures that can be taken in addition to the respective standards, so that the integrity of the synchronization process and thus the integrity of the distributed time-base can be ensured.

In the light of this state of the art, the object of the present invention is to provide a solution for validation of a time synchronization of a communication network of an automated vehicle, wherein it is preferably ensured that a predefined safety integrity level is fulfilled, e.g. ASIL B or higher.

The object is solved by the features of the claimed invention.

More specifically, the object is solved by a method for validating a time synchronization in a communication network of an automated vehicle.

The vehicle can be an automated or autonomous vehicle, e.g. a vehicle with an automated system of SAE Level 3 or higher. At SAE Level 3 (i.e. "eyes off") the driver can safely turn their attention away from the driving tasks, e.g. the driver can text or watch a movie. The vehicle will handle situations that call for an immediate response, like emergency braking. The driver must still be prepared to intervene within some limited time, specified by the manufacturer, when called upon by the vehicle to do so. The automated system is like a co-driver that will alert the driver in an orderly fashion when it is the driver's turn to drive. An example would be a Traffic Jam Chauffeur. At SAE Level 4 (i.e. "mind off") no driver attention is ever required for safety, e.g. the driver may safely go to sleep or leave the driver's seat. Self-driving is supported only in limited spatial areas (e.g. geofenced) or under special circumstances. Outside of these areas or circumstances, the vehicle must be able to safely abort the trip, e.g. park the car, if the driver does not retake control. An example would be a robotic taxi or a robotic delivery service that only covers selected locations in a specific area. At SAE Level 5 (i.e. "steering wheel optional") no human intervention is required at all. An example would be a robotic taxi that works on all roads all over the world, all year around, in all weather conditions.

The communication network comprises a master clock, and a first communication network of a first communication standard. The first communication network comprises at least two control units and a central validator.

That is, the at least two control units and the central validator of the first communication network are connected to each other via a first bus, wherein the at least two control units and the central validator of the first communication network communicate with each other using the first communication standard.

The method comprises sending a time synchronization message from the master clock to the two control units of the first communication network, respectively, wherein the time synchronization message includes a master time.

In other words, the master clock, which may implemented solely as QM, sends the time synchronization message to the first communication network, such that the master time of the master clock can be used for time synchronization in the first communication network.

The method further comprises synchronizing a local time of the two control units of the first communication network to the received master time, respectively.

That is, each one of the two control units of the first communication network may comprise a local clock, i.e. a slave clock, which is updated, e.g. periodically, to the master time received from the master clock.

The method further comprises sending the synchronized local time of the two control units of the first communication network to the central validator of the first communication network, respectively.

That is, after updating, i.e. synchronizing, their respective slave clocks to the master time, each one of the two control units of the first communication network sends their synchronized local time to the central validator of the first communication network.

The method further comprises comparing, at the central validator of the first communication network, the received synchronized local times to each other, and if a difference between the received synchronized local times is bigger than a predefined first threshold, the central validator of the first communication network outputs an error message to the automated vehicle.

In other words, the central validator of the first communication network may be implemented with ASIL B or higher, e.g. ASIL D, and is configured to compare the synchronized times of the two control units of the first communication network to each other. Theoretically, the synchronized times of the two control units of the first communication network should be the same. Due to latencies and/or due to a hard- and/or software bug in the communication network these synchronized times may however differ from each other. If the difference, which is determined by the central validator of the first communication network, is within an acceptable range, wherein this range depends on the safety integrity level of the respective central validator (e.g. ASIL B or higher), no error flag will be raised by the respective central validator. Otherwise, the respective central validator will raise the error flag.

The method may further comprise sending the time synchronization message from the master clock to the central validator of the first communication network, and synchronizing a local time of the central validator of the first communication network to the received master time.

Afterwards the method may further comprise comparing, at the central validator of the first communication network, the received synchronized local times of the two control units of the first communication network to the synchronized local time of the central validator of the first communication network, respectively, and if a difference between at least one of the received synchronized local times and the synchronized local time of the central validator of the first communication network is bigger than a predefined second threshold, the central validator of the first communication network may output the error message to the automated vehicle.

That is, the master time is sent from the master clock not only to the slave clocks of the two control units of the first communication network but also to the central validator of the first communication network. Thus, it is possible for the central validator of the first communication network to update its local time to the received master time and thus, additionally to the above described comparison of the local times of the two control units of the first communication network, the central validator of the first communication network may also use its own synchronized local time for a comparison with the synchronized local times of the two control units of the first communication network. This can further increase the reliability of the time validation.

The communication network may further comprise a second communication network of a second communication standard, wherein the second communication network comprises at least two control units and a central validator.

The method may further comprise, analogously to the method described above with respect to the first communication network, sending the time synchronization message from the master clock to the two control units of the second communication network, respectively. Then a local time of the two control units of the second communication network may be synchronized to the received master time, respectively. The two control units may afterwards send their synchronized local times to the central validator of the second communication network, respectively. Thus it is possible for the central validator of the second communication network to compare the received synchronized local times to each other, and, if a difference between the received synchronized local times is bigger than the predefined first threshold, to output the error message to the automated vehicle.

Also here, the method may further comprise sending the time synchronization message from the master clock to the central validator of the second communication network, synchronizing a local time of the central validator of the second communication network to the received master time, comparing, at the central validator of the second communication network, the received synchronized local times of the two control units of the second communication network to the synchronized local time of the central validator of the second communication network, respectively, and, if a difference between at least one of the received synchronized local times and the synchronized local time of the central validator of the second communication network is bigger than the predefined second threshold, outputting the error message from the central validator of the second communication network to the automated vehicle.

The above given description with respect to the first communication network also holds through for the second communication network. Moreover, with the present solution it is possible to provide two subnetworks, i.e. the first and the second communication network, using different communication standards, wherein both subnetworks may fulfill the same safety integrity level such that data, i.e. information, provided by the two subnetworks may be used together, e.g. in a sensor data fusion for implementing certain driver assistance functions of the automated vehicle.

The communication network may further comprise a third communication network of a third communication standard, wherein the third communication network may comprise a control unit.

Here, the central validator of the first communication network may be also connected to the third communication network and may be configured to act as a gateway control unit for the first and the third communication network.

That is, the central validator of the first communication network may also be provided for the third communication network. The central validator may be a gateway control unit, i.e. may be configured to allow data to flow from the first communication network to the third communication network, wherein these networks use different communication standards. Therefore, the gateway control unit may comprise a protocol translator for translating, i.e. converting, the data send with a protocol used by the first communication standard to a protocol used by the third communication standard and/or vice versa.

The method may further comprise sending the time synchronization message from the master clock to the control unit of the third communication network, synchronizing a local time of the control unit of the third communication network to the received master time, sending the synchronized local time of the control unit of the third communication network to the central validator of the first communication network, comparing, at the central validator of the first communication network, the received synchronized local time of the control unit of the third communication network to the received synchronized local times of the control units of the first communication network, respectively, and, if a difference between the received synchronized local time of the control unit of the third communication network and at least one of the received synchronized local times of the control units of the first communication network is bigger than the predefined first threshold, outputting the error message from central validator of the first communication network to the automated vehicle.

In other words, the gateway control unit may be configured to carry out the method described above with respect to the first communication network not only for the control units of the first communication network but also for the control units of the third communication network, thereby ensuring/validating the time synchronization of the two communication networks.

The first communication network may further comprise at least two further control units and a further central validator.

The method may further comprise sending the time synchronization message from the master clock to the two further control units of the first communication network, respectively, synchronizing a local time of the two further control units of the first communication network to the received master time, respectively, sending the synchronized local time of the two further control units of the first communication network to the further central validator of the first communication network, respectively, comparing, at the further central validator of the first communication network, the received synchronized local times to each other, and, if a difference between the received synchronized local times is bigger than the predefined first threshold, outputting the error message from the further central validator of the first communication network to the automated vehicle.

The method may further comprise sending the time synchronization message from the master clock to the further central validator of the first communication network, synchronizing a local time of the further central validator of the first communication network to the received master time, comparing, at the further central validator of the first communication network, the received synchronized local times of the two further control units of the first communication network to the synchronized local time of the further central validator of the first communication network, respectively, and, if a difference between at least one of the received synchronized local times and the synchronized local time of the further central validator of the first communication network is bigger than the predefined second threshold, outputting the error message from the further central validator of the first communication network to the automated vehicle.

That is, it is possible to provide more than one central validator for a communication network. Each one of the central validators provided for one of the communication networks may then be connected to several control units of the respective communication network, i.e. several control units can be combined/grouped into one zone and for each zone a central validator can be provided. Thus, a scalable solution can be provided.

Moreover, the method may comprise sending the synchronized local time of the further central validator of the first communication network to the central validator of the first communication network, comparing, at the central validator of the first communication network, the received synchronized local time of the further central validator of the first communication network to the local synchronized time of the central validator of the first communication network, and, if a difference between the received synchronized local time of the further validator and the synchronized local time of the central validator of the first communication network is bigger than a predefined third threshold, outputting the error message from the central validator of the first communication network to the automated vehicle. Additionally or alternatively, the method may comprise sending the synchronized local time of the central validator of the first communication network to the further central validator of the first communication network, comparing, at the further central validator of the first communication network, the received synchronized local time of the central validator of the first communication network to the local synchronized time of the further central validator of the first communication network, and, if a difference between the received synchronized local time of the central validator and the synchronized local time of the further central validator of the first communication network is bigger than the predefined third threshold, outputting the error message from the further central validator of the first communication network to the automated vehicle.

It is possible that the first, the second and the third threshold are the same values or are different from each other.

That is, the central validators of the first communication network provided for each zone, respectively, may not only validate a time synchronization in their respective zone, but may additionally provide a cross checking of the time synchronization between the respective zones.

The method may further comprise checking, at at least one control unit of the first, the second and/or the third communication network, if the master time received within the time synchronization message from the master clock is plausible or not, and, if the received master time is not plausible, outputting the error message from the at least one control unit to the automated vehicle.

In other words, additionally to the validation of the time synchronization carried out centrally at the respective central validator provided for the respective control unit, it is also possible to locally check the time synchronization at each control unit.

Furthermore, an automated vehicle configured to carry out the above described method is provided.

The automated vehicle may comprise a communication network. The communication network may comprise a master clock, and a first communication network of a first communication standard, wherein the first communication network comprises at least two control units and a central validator.

The master clock may be configured to send a time synchronization message to the two control units of the first communication network, respectively, wherein the time synchronization message includes a master time.

The two control units of the first communication network may be configured to synchronize their local times to the received master time, respectively.

The two control units of the first communication network may be configured to send their synchronized local time to the central validator of the first communication network, respectively.

The central validator of the first communication network may be configured to compare the received synchronized local times to each other and, if a difference between the received synchronized local times is bigger than a predefined first threshold, to output an error message to the automated vehicle.

Furthermore, the master clock may be configured to send the time synchronization message from the master clock to the central validator of the first communication network.

The central validator of the first communication network may be configured to synchronize its local time to the received master time.

The central validator of the first communication network may be configured to compare the received synchronized local times of the two control units of the first communication network to its synchronized local time, respectively.

The central validator of the first communication network may be configured to output the error message to the automated vehicle, if a difference between at least one of the received synchronized local times and its synchronized local time is bigger than a predefined second threshold.

The communication network may further comprise a second communication network of a second communication standard, wherein the second communication network comprises at least two control units and a central validator.

The master clock may be configured to send the time synchronization message to the two control units of the second communication network, respectively.

The two control units of the second communication network may be configured to synchronize their local times to the received master time, respectively.

The two control units of the second communication network may be configured to send their synchronized local times to the central validator of the second communication network, respectively.

The central validator of the second communication network may be configured to compare the received synchronized local times to each other, and, if a difference between the received synchronized local times is bigger than the predefined first threshold, to output the error message to the automated vehicle.

The master clock may be configured to send the time synchronization message to the second communication network.

The central validator of the second communication network may be configured to synchronize its local time to the received master time.

The central validator of the second communication network may be configured to compare the received synchronized local times of the two control units of the second communication network to its synchronized local time, respectively, and if a difference between at least one of the received synchronized local times and the synchronized local time of the central validator of the second communication network is bigger than the predefined second threshold, to output the error message to the automated vehicle.

The communication network may further comprise a third communication network of a third communication standard, wherein the third communication network comprises a control unit.

The central validator of the first communication network may be connected to the third communication network and may be configured to act as a gateway control unit for the first and the third communication network.

The master clock may be configured to send the time synchronization message to the third communication network, especially to the control unit of the third communication network.

The control unit of the third communication network may be configured to synchronize its local time to the received master time, and to send its synchronized local time to the central validator of the first communication network.

The central validator of the first communication network may be configured to compare the received synchronized local time of the control unit of the third communication network to the received synchronized local times of the control units of the first communication network, respectively, and, if a difference between the received synchronized local time of the control unit of the third communication network and at least one of the received synchronized local times of the control units of the first communication network is bigger than the predefined first threshold, to output the error message to the automated vehicle.

The first communication network may further comprise at least two further control units and a further central validator.

The master clock may be configured to send the time synchronization message to the two further control units of the first communication network, respectively.

The two further control units of the first communication network may be configured to synchronize their local times to the received master time, respectively, and to send their synchronized local times to the further central validator of the first communication network, respectively.

The further central validator of the first communication network may be configured to compare the received synchronized local times to each other, and, if a difference between the received synchronized local times is bigger than the predefined first threshold, to output the error message to the automated vehicle.

The master clock may be configured to send the time synchronization message to the further central validator of the first communication network.

The further central validator of the first communication network may be configured to synchronize its local time to the received master time.

The further central validator of the first communication network may be configured to compare the received synchronized local times of the two further control units of the first communication network to its synchronized local time, respectively.

If a difference between at least one of the received synchronized local times and the synchronized local time of the further central validator of the first communication network is bigger than the predefined second threshold, the further central validator of the first communication network may be configured to output the error message to the automated vehicle.

The further central validator of the first communication network may be configured to send its synchronized local time to the central validator of the first communication network.

The central validator of the first communication network may be configured to compare the received synchronized local time of the further central validator of the first communication network to its local synchronized time, and, if a difference between the received synchronized local time of the further central validator of the first communication network and the synchronized local time of the central validator of the first communication network is bigger than a predefined third threshold, to output the error message to the automated vehicle.

Alternatively or additionally, the central validator of the first communication network may be configured to send its synchronized local time to the further central validator of the first communication network.

The further central validator of the first communication network may be configured to compare the received synchronized local time of the central validator of the first communication network to its local synchronized time.

If a difference between the received synchronized local time of the central validator of the first communication network and the synchronized local time of the further central validator of the first communication network is bigger than the predefined third threshold, the further central validator of the first communication network may be configured to output the error message to the automated vehicle.

At least one, at least some or all of the above described control units may be configured to check if the master time received within the time synchronization message from the master clock is plausible or not, and, if the received master time is not plausible, to output the error message to the automated vehicle.

Moreover, the above given description with respect to the method also holds through for the automated vehicle and vice versa.

The above given explanation of embodiments of the invention may be summarized in other words as follows. A master clock will provide a synchronization message to all nodes, i.e. all electronic control units (ECUs), with their respective communication bus, e.g. Ethernet, CAN-FD, LIN and/or Flexray. The master clock could be implemented with only QM. All the safety relevant ECUs with their respective communication bus need to implement certain local monitoring based on local clocks with safety integrity according to ASIL B or ASIL D. A master or a multi-zone validator with different communication buses will be implemented with ASIL D, wherein all respective nodes from the network will send their respective synchronization status to the validator. There may be one or more multi-zone communication bus validators based on different ECUs and/or different communication buses. The synchronization of different multi-zone validators could be achieved by cross-checking their time synchronization according to forward and/backward time synchronization of the respective clocks, i.e. against each other. The validator will verify all inputs and, in case of any mismatch of time synchronization, raise an error flag.

In the following, a description of an embodiment of the present invention is given with respect to FIGS. 1 and 2.

DETAILED DESCRIPTION OF THE DRAWINGS

Figure 1:
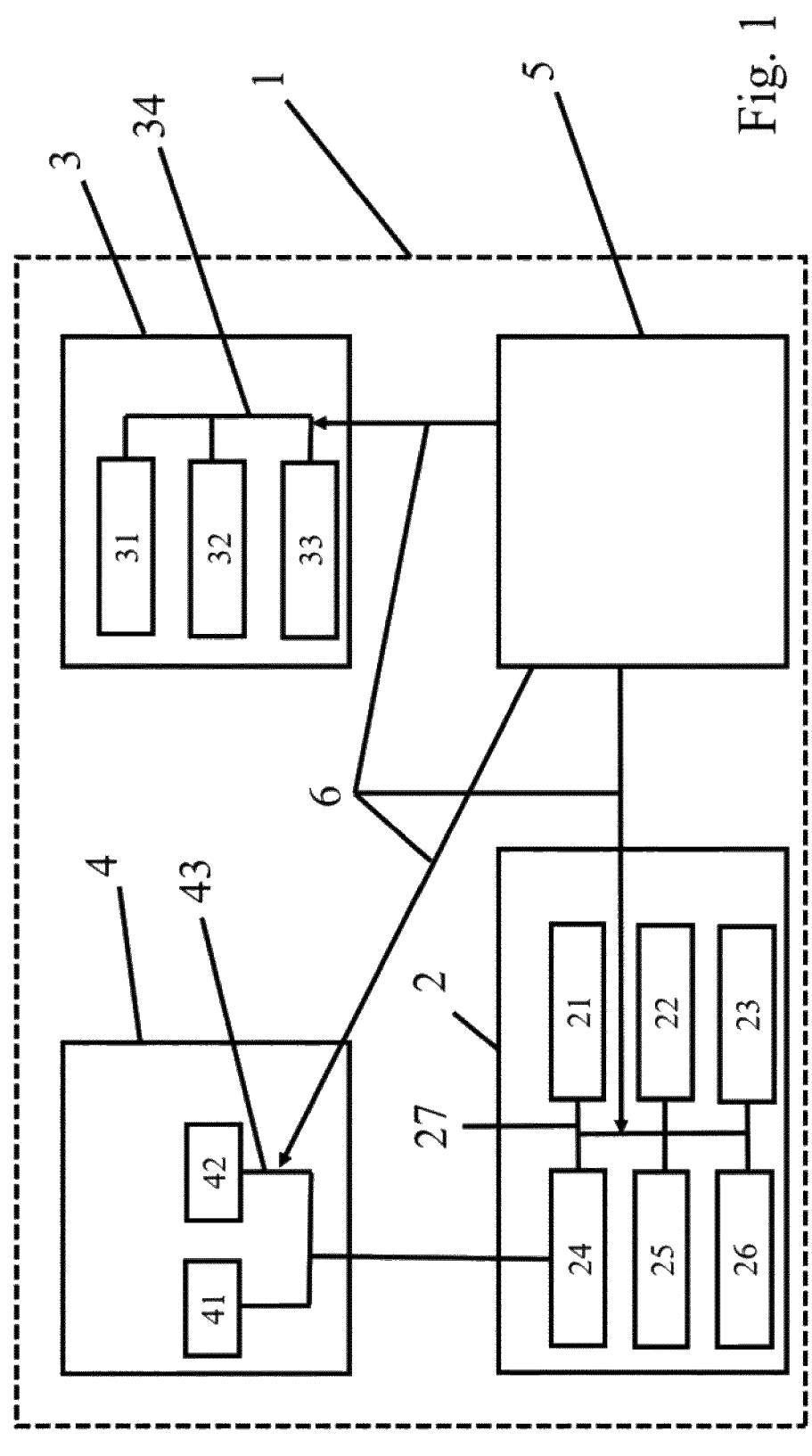
FIG. 1 depicts schematically a communication network of an automated vehicle.

As can be gathered from FIG. 1, the communication network 1 is divided into three subsystems, i.e. a first communication network 2, a second communication network 3 and a third communication network 4. Furthermore, the communication network 1 comprises a master clock 5.

The first communication network 2 comprises four control units 22, 23, 25, 26 and two central validators 21, 24 connected via a bus 27 to each other, wherein one of the central validators 21 is provided for two of the control units 22, 23 and the other central validator 24 is provided for the other two control units 25, 26. In the first communication network 2 a first communication standard is used, e.g. Ethernet.

The second communication network 3 comprises two control units 31, 32 and a central validator 33 connected via a bus 34 to each other, wherein the central validator 33 is provided for the two control units 31, 32. In the second communication network 3 a second communication standard is used, e.g. Flexray.

The third communication network 4 comprises two control units 41, 42 connected via a bus 43 to each other, wherein the central validator 24 of the first communication network 2 is also connected to the third communication network 4 via the bus 43 and is also provided for the two control units 41, 42 of the third communication network 4. In the third communication network 4 a third communication standard is used, e.g. CAN FD. The central validator 24 of the first communication network 2 acts as a gateway control unit and is configured to translate between the first and the third communication standard.

Figure 2:
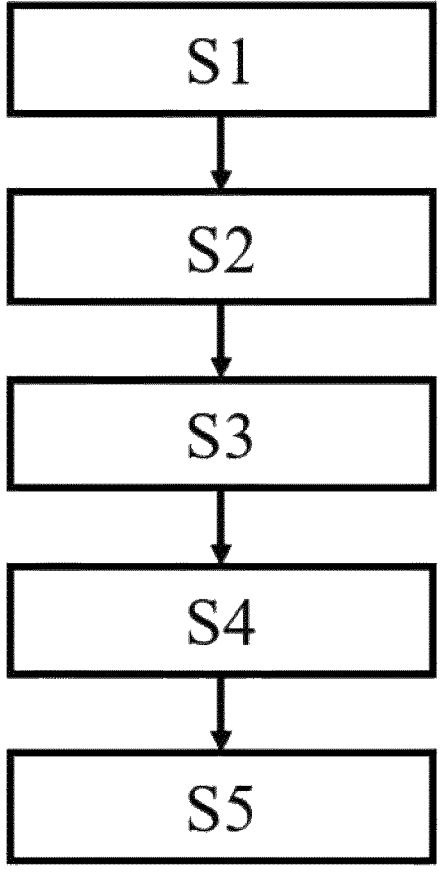
FIG. 2 depicts a flowchart of a method for validating a time synchronization in the communication network shown in FIG. 1.

With the above described communication network 1 the automated vehicle is configured to carry out the method described with respect to FIG. 2.

As can be gathered from FIG. 2 the method for validating a time synchronization in the communication network 1 comprises substantially five steps S1-S5.

In a first step S1 of the method, a time synchronization message 6 is sent from the master clock 5 to the first, the second and the third communication network 2, 3, 4, respectively, wherein the time synchronization message 6 includes a master time.

In a second step S2 of the method, a local time of all control units 22, 23, 25, 26, 31, 32, 41, 42 as well as a local time of all central validators 21, 24, 33 is synchronized to the master time included in the time synchronization message 6.

In a third step S3 of the method, the control units 22, 23 of the first communication network 2 send their synchronized local times to the central validator 21 of the first communication network 2, respectively. The control units 25, 26 of the first communication network 2 and the control units 41, 42 of the third communication network 4 send their synchronized time to the central validator 24 of the first communication network 2. The control units 31, 32 of the second communication network 3 send their synchronized local times to the central validator 33 of the second communication network 3. Furthermore, the two central validators 21, 24 of the first communication network 2 send their synchronized local times to each other, respectively.

In a fourth step S4 of the method, each one of the central validators 21, 24, 33 compares the received local times of the respective control units 22, 23, 25, 26, 31, 32, 41, 42 to each other and also to its respective local synchronized time. Furthermore, the two central validators 21, 24 of the first communication network 2 compare their synchronized local times to each other, respectively.

If one of the central validators 21, 24, 33 determines in a fifth step S5 of the method, that a difference between the received synchronized local times of the control units 22, 23, 25, 26, 31, 32, 41, 42 and/or a difference between the received synchronized local times of the control units 22, 23, 25, 26, 31, 32, 41, 42 and the local time of the respective validator 21, 24, 33 is bigger than a predefined threshold, the respective one of the central validators 21, 24, 33 outputs an error message to the automated vehicle.

Furthermore, if one of the two validators 21, 24 of the first communication network 2 determines in the fifth step S5, that a difference between the received synchronized local time of the other one of the two validators 21, 24 of the first communication network 2 and its own synchronized local time is bigger than the predefined threshold, the respective one of the validators 21, 24 outputs the error message to the automated vehicle.

Moreover, in the fifth step S5 each one of the control units 22, 23, 25, 26, 31, 32, 41, 42 checks if the master time received within the time synchronization message 6 from the master clock 5 is plausible or not, and if the received master time is not plausible, outputs the error message to the automated vehicle.

REFERENCE SIGNS LIST 1 communication network
2 first communication network
3 second communication network
4 third communication network
5 master clock
6 time synchronization message
21, 24, 33 central validator
22, 23, 25, 26, 31, 32, 41, 42 control unit

The invention claimed is:

1. A method for validating a time synchronization in a communication network of an automated vehicle, wherein the communication network comprises a master clock and a first communication network of a first communication standard, and the first communication network comprises two first control units and a first central validator, the method comprising:

sending a time synchronization message from the master clock to the two first control units of the first communication network, respectively, wherein the time synchronization message includes a master time, synchronizing a local time of the two first control units of the first communication network to the received master time, respectively, sending the synchronized local time of the two first control units of the first communication network to the first central validator of the first communication network, respectively, comparing, at the first central validator of the first communication network, the received synchronized local times of the two first control units of the first communication network to each other, and upon determining that a difference between the received synchronized local times of the two first control units of the first communication network is larger than a predefined first threshold, outputting an error message from the first central validator of the first communication network to the automated vehicle.

2. The method according to claim 1, further comprising:

sending the time synchronization message from the master clock to the first central validator of the first communication network, synchronizing a local time of the first central validator of the first communication network to the received master time, comparing, at the first central validator of the first communication network, the received synchronized local times of the two first control units of the first communication network to the synchronized local time of the first central validator of the first communication network, respectively, and upon determining that a difference between at least one of the received synchronized local times of the two first control units of the first communication network and the synchronized local time of the first central validator of the first communication network is larger than a predefined second threshold, outputting the error message from first central validator of the first communication network to the automated vehicle.

3. The method according to claim 1, wherein the communication network further comprises a second communication network of a second communication standard, and the second communication network comprises two second control units and a second central validator, the method further comprising:

sending the time synchronization message from the master clock to the two second control units of the second communication network, respectively, synchronizing a local time of the two second control units of the second communication network to the received master time, respectively, sending the synchronized local time of the two second control units of the second communication network to the second central validator of the second communication network, respectively, comparing, at the second central validator of the second communication network, the received synchronized local times of the two second control units of the second communication network to each other, and upon determining that a difference between the received synchronized local times of the two second control units of the second communication network is larger than the predefined first threshold, outputting the error message from the second central validator of the second communication network to the automated vehicle.

4. The method according to claim 3, further comprising:

sending the time synchronization message from the master clock to the second central validator of the second communication network, synchronizing a local time of the second central validator of the second communication network to the received master time, comparing, at the second central validator of the second communication network, the received synchronized local times of the two second control units of the second communication network to the synchronized local time of the second central validator of the second communication network, respectively, and upon determining that a difference between at least one of the received synchronized local times of the two second control units of the second communication network and the synchronized local time of the second central validator of the second communication network is larger than the predefined second threshold, outputting the error message from the second central validator of the second communication network to the automated vehicle.

5. The method according to claim 1, wherein the communication network further comprises a third communication network of a third communication standard, the third communication network comprises a third control unit, and the first central validator of the first communication network is connected to the third communication network and is configured to act as a gateway control unit for the first communication network and the third communication network, the method further comprising:

sending the time synchronization message from the master clock to the third control unit of the third communication network, synchronizing a local time of the third control unit of the third communication network to the received master time, sending the synchronized local time of the third control unit of the third communication network to the first central validator of the first communication network, comparing, at the first central validator of the first communication network, the received synchronized local time of the third control unit of the third communication network to the received synchronized local times of the first control units of the first communication network, respectively, and upon determining that a difference between the received synchronized local time of the third control unit of the third communication network and at least one of the received synchronized local times of the first control units of the first communication network is larger than the predefined first threshold, outputting the error message from the first central validator of the first communication network to the automated vehicle.

6. The method according to claim 5, further comprising:

checking, at at least one control unit of at least one of the first communication network, the second communication network, or the third communication network, if the master time received within the time synchronization message from the master clock is plausible or not, and upon determining that the received master time is not plausible, outputting the error message from the at least one control unit to the automated vehicle.

7. The method according to claim 1, wherein the first communication network further comprises at least two further control units and a further central validator, the method further comprising:

sending the time synchronization message from the master clock to the two further control units of the first communication network, respectively, synchronizing a local time of the two further control units of the first communication network to the received master time, respectively, sending the synchronized local time of the two further control units of the first communication network to the further central validator of the first communication network, respectively, comparing, at the further central validator of the first communication network, the received synchronized local times of the two further control units of the first communication network to each other, and upon determining that a difference between the received synchronized local times of the two further control units of the first communication network is larger than the predefined first threshold, outputting the error message from the further central validator of the first communication network to the automated vehicle.

8. The method according to claim 7, further comprising:

sending the time synchronization message from the master clock to the further central validator of the first communication network, synchronizing a local time of the further central validator of the first communication network to the received master time, comparing, at the further central validator of the first communication network, the received synchronized local times of the two further control units of the first communication network to the synchronized local time of the further central validator of the first communication network, respectively, and upon determining that a difference between at least one of the received synchronized local times of the two further control units of the first communication network and the synchronized local time of the further central validator of the first communication network is larger than the predefined second threshold, outputting the error message from the further central validator of the first communication network to the automated vehicle.

9. The method according to claim 8, further comprising:

sending the synchronized local time of the further central validator of the first communication network to the first central validator of the first communication network, comparing, at the first central validator of the first communication network, the received synchronized local time of the further central validator of the first communication network to the local synchronized time of the first central validator of the first communication network, and upon determining that a difference between the received synchronized local time of the further central validator of the first communication network and the synchronized local time of the first central validator of the first communication network is larger than a predefined third threshold, outputting the error message from the first central validator of the first communication network to the automated vehicle.

10. The method according to claim 8, further comprising:

sending the synchronized local time of the first central validator of the first communication network to the further central validator of the first communication network, comparing, at the further central validator of the first communication network, the received synchronized local time of the first central validator of the first communication network to the local synchronized time of the further central validator of the first communication network, and upon determining that a difference between the received synchronized local time of the first central validator of the first communication network and the synchronized local time of the further central validator of the first communication network is larger than a predefined third threshold, outputting the error message from the further central validator of the first communication network to the automated vehicle.

11. An automated vehicle comprising a communication network, wherein:

the communication network comprises a master clock and a first communication network of a first communication standard, and the first communication network comprises two first control units and a first central validator, the master clock is configured to send a time synchronization message to the two first control units of the first communication network, respectively, wherein the time synchronization message includes a master time, the two first control units of the first communication network are configured to synchronize their local times to the received master time, respectively, the two first control units of the first communication network are configured to send their synchronized local times to the first central validator of the first communication network, respectively, the first central validator is configured to compare the received synchronized local times of the two first control units of the first communication network to each other, and the first central validator is configured, upon determining that a difference between the received synchronized local times of the two first control units of the first communication network is larger than a predefined first threshold, to output an error message to the automated vehicle.

* * * * *